(12) United States Patent
Choi

(10) Patent No.: US 11,829,891 B2
(45) Date of Patent: Nov. 28, 2023

(54) INTEGRATED HOSPITAL LOGISTICS MANAGEMENT SYSTEM USING AI TECHNOLOGY, AND INTEGRATED HOSPITAL LOGISTICS MANAGEMENT METHOD USING SAME

(71) Applicant: TBO HEALTHCARE CO., LTD., Gyeonggi-do (KR)

(72) Inventor: Jae Hoon Choi, Gyeonggi-do (KR)

(73) Assignee: TBO HEALTHCARE CO., LTD., Seongnam-si Gyeonggi-do (KR)

( * ) Notice: Subject to any disclaimer, the term of this patent is extended or adjusted under 35 U.S.C. 154(b) by 0 days.

(21) Appl. No.: 18/122,338

(22) Filed: Mar. 16, 2023

(65) Prior Publication Data
US 2023/0237346 A1 Jul. 27, 2023

Related U.S. Application Data

(63) Continuation of application No. PCT/KR2021/012561, filed on Sep. 15, 2021.

(30) Foreign Application Priority Data

Sep. 18, 2020 (KR) .................. 10-2020-0120659

(51) Int. Cl.
G06N 5/04 (2023.01)
G06N 5/025 (2023.01)

(52) U.S. Cl.
CPC .............. *G06N 5/025* (2013.01); *G06N 5/04* (2013.01)

(58) Field of Classification Search
CPC ...................................... G06N 5/025
USPC ..................................... 706/47, 45
See application file for complete search history.

(56) References Cited

FOREIGN PATENT DOCUMENTS

KR 10-2116692 B1 5/2020

OTHER PUBLICATIONS

Silva-Aravena, et al., Inventory Management at a Chilean Hospital Pharmacy: Case Study of a Dynamic Decision-Aid Tool, Mathematics 2020, 8, 1962, 2020, pp. 1-20 (Year: 2020).*

(Continued)

*Primary Examiner* — Wilbert L Starks
(74) *Attorney, Agent, or Firm* — Dinsmore & Shohl LLP; Yongsok Choi, Esq.

(57) ABSTRACT

An integrated hospital logistics management system and an integrated hospital logistics management method using same is provided. Artificial intelligence analyzes trends and seasonal trends by using big data and predicts actual usage by using an artificial intelligence technology, and an artificial intelligence system automatically processes reorders, replacements, etc., thereby ensuring that an appropriate safety stock level can be maintained at all times according to a stock quantity, stock state, issue quantity, etc. of hospital supplies. The integrated hospital logistics management system includes an order processing module which processes ordering and warehousing of supplies; a logistics management module which requests the order processing module to purchase or replace the supplies according to the states of the supplies; and a system control module including a machine learning unit which generates and learns rules about the operation of the supplies by using metadata.

4 Claims, 11 Drawing Sheets

(56) References Cited

OTHER PUBLICATIONS

Office Action issued by Korean Intellectual Property Office in priority application KR 10-2020-0120659, dated Nov. 2, 2020, pp. 1-10.
Office Action issued by Korean Intellectual Property Office in priority application 10-2020-0120659, dated Jan. 2, 2021, pp. 1-10.

* cited by examiner

FIG. 6

| | | | | | | Projection Simulator | | | | | | | | | Adjustment |
|---|---|---|---|---|---|---|---|---|---|---|---|---|---|---|---|
| x | Item A | Item B | Item C | Item D | Item E | | | stock | | x | a | b | c | d | e | value of e |
| -6 | 100 | 100 | 100 | 100 | 100 | max | 600 | | 1 | 170 | 147 | 100 | 30 | -14 | 0 |
| -5 | 110 | 100 | 100 | 90 | 50 | min | 300 | | 2 | 180 | 154 | 100 | 20 | -28 | 0 |
| -4 | 130 | 120 | 100 | 80 | 50 | | | | 3 | 190 | 161 | 100 | 10 | -41 | 0 |
| -3 | 130 | 120 | 100 | 70 | 30 | | | | 4 | 200 | 168 | 100 | 0 | -55 | 0 |
| -2 | 140 | 130 | 100 | 60 | 30 | | | | 5 | 210 | 174 | 100 | -10 | -69 | 0 |
| -1 | 150 | 130 | 100 | 50 | 20 | | | | | | | | | | |
| 0 | 160 | 140 | 100 | 40 | 0 | | | | | | | | | | |

FIG. 8

| LPO Date | Delivery Date | Item | Specifications | Quantity (1Box*50ea) | Price | Days Left |
|---|---|---|---|---|---|---|
| 2020-06-25 | 2020-09-25 | Syringe | 3mm pre-filled | 50 | 50000 | 30 |
| 2020-07-16 | 2020-08-27 | Gauze | | 20 | 30000 | 1 |
| 2020-03-03 | 2020-08-27 | Medication A | Diabetes Treatment | 1 | 200000 | 1 |
| 2020-04-29 | 2020-08-28 | Medication B | | 1 | 100000 | 2 |
| 2020-02-29 | 2020-08-25 | Antibiotics X | 0.02mg capsule | 1 | 600000 | 1 |
| 2020-06-10 | 2020-09-06 | Saline Solution | 100mL | 3 | 100000 | 11 |

FIG. 9

| months | Item Z | Item Y |
|---|---|---|
| -6 | 0 | 0 |
| -5 | 0 | 0 |
| -4 | 0 | 30 |
| -3 | 0 | 0 |
| -2 | 0 | 0 |
| -1 | 0 | 10 |
| 0 | 0 | 0 |
| 6-month average usage | | 5.714286 |
| AI-based 6-month average consumption | 50 | 100 |

| Months from now | Item Z | Item Y |
|---|---|---|
| 1 | 0 | 4.285714 |
| 2 | 0 | 3.928571 |
| 3 | 0 | 3.571429 |
| 4 | 0 | 3.214286 |
| 5 | 0 | 2.857143 |
| 6 | 0 | 2.5 |
| 7 | 0 | 2.142857 |
| 8 | 0 | 1.785714 |
| 9 | 0 | 1.428571 |
| 10 | 0 | 1.071429 |
| 12 | 0 | 0.357143 |

INTEGRATED HOSPITAL LOGISTICS MANAGEMENT SYSTEM USING AI TECHNOLOGY, AND INTEGRATED HOSPITAL LOGISTICS MANAGEMENT METHOD USING SAME

CROSS-REFERENCE TO RELATED APPLICATIONS

This application is a continuation of International Application No. PCT/KR2021/012561 filed on Sep. 15, 2021, which claims priority to Korean Patent Application No. 10-2020-0120659 filed on Sep. 18, 2020, the entire contents of which are herein incorporated by reference.

TECHNICAL FIELD

The present disclosure relates to an integrated hospital logistics management system and an integrated hospital logistics management method using the same, in which artificial intelligence analyzes trends and seasonal trends using big data and predicts actual usage through an artificial intelligence technology to have an artificial intelligence system automatically process reorders and replacements, thereby maintaining an appropriate safety stock level at all times according to a stock quantity, stock state, and issue quantity of hospital items.

BACKGROUND ART

With the recent development of scientific technology, various types of hospital items have been developed, and the overall transaction volume of various items used in hospitals is also soaring rapidly alongside with the trend.

Such transactions of hospital items have been traditionally carried out by offline contracts between buyers and sellers, but in recent years, websites for purchase/sales of hospital items that may implement contracts between buyers and sellers online have been established based on the Internet environment owing to the rapid spread of Internet technology.

For example, Korean Patent Application Publication No. 10-2000-36933 titled "a method of providing a product purchase system for hospitals in a computer network system and a record medium thereof" and Korean Patent No. 10-0888 disclose in detail an example of a website for purchase/sales of hospital items according to the related art.

However, prior technologies including the above prior art have a restricted range of roles that simply covers only intermediation of transactions for hospital items targeting an unspecified number of buyers/sellers, barely providing systematic management and operation for hospital logistics as a whole.

Particularly, in the case of integrated management of multiple hospitals or the case of large hospitals with large volume of items to take care of, it is difficult for managers to handle all the items and also to place reorders in conjunction with real-time usage, such that there is an urgent need for a logistics management system that carries out overall operations in relation to hospital logistics management as well as a technology that automatically enables integrated hospital logistics management through an artificial intelligence technology without the intervention of a manager who is a natural individual.

SUMMARY

Technical Goals

The present disclosure has been proposed to solve the problems as described above, and an object of the present disclosure is to provide an integrated hospital logistics management system and an integrated hospital logistics management method using the same, in which artificial intelligence analyzes trends and seasonal trends using big data and predicts actual usage through an artificial intelligence technology to have an artificial intelligence system automatically process reorders and replacements, thereby maintaining an appropriate safety stock level at all times according to a stock quantity, stock state, and issue quantity of hospital items.

Technical Solutions

An integrated hospital logistics management system according to the present disclosure for the purpose of solving the above issue includes an order processing module configured to process ordering and warehousing of items by being linked to suppliers that provide hospital items, a logistics management module configured to request the order processing module to purchase or replace the items according to a state of items in a hospital, and a system control module including a machine learning unit configured to generate and learn rules related to operation of the items by using metadata and a control unit configured to control the logistics management module according to the rules.

In addition, the machine learning unit includes a rule database configured to store the generated rules, a rule engine linked to the rule database and configured to retrieve the rules stored in the rule database or store the generated rules in the rule database, and an AI engine including a data collection part linked to the rule engine and configured to collect raw data of each item provided by the supplier, a rule generation part configured to extract regulations and conditions related to the operation of each item from the raw data to generate the rules, and a rule learning part configured to learn the metadata as learning data to reinforce the rules.

Furthermore, the rule is a stock management regulation to determine an order quantity according to a stock quantity, the learning data includes usage record and purchase record for a predetermined period for the item, and the rule learning part is configured to calculate an average amount of waste through the usage record and purchase record and reflect the calculation in the stock management regulation so as to variably apply the safety stock level.

On the other hand, an integrated hospital logistics management method using the system of the present disclosure includes extracting, through raw data for each item in a hospital provided by a supplier, regulations and conditions related to operation of the item to generate rules, metadataizing input big data and learning and reinforcing the rules using the metadata as learning data, and checking a state of the item and requesting the supplier for a stock processing request including purchase or replacement for the item according to the rules.

Advantageous Effects

The present disclosure having the above composition, steps, and characteristics analyzes trends and seasonal trends related to hospital items through a machine learning unit which is configured to generate and learn rules related to the operation of items using metadata, and predicts actual usage to have an artificial intelligence system automatically process reorders and replacements, thereby maintaining an appropriate safety stock level at all times according to a stock quantity, stock state, and issue quantity of hospital items.

In particular, by applying the raw data provided by each supplier, it is possible to process orders or replacements in consideration of issues for the items as well as periodic elements such as service life or expiration date, thereby providing hospital logistics management that enables automatic management of stock quantity as well as stock state.

Moreover, by continuously learning the rules related to hospital item management through machine learning, key elements of logistics management, including safety stock levels, are continuously updated in accordance with changes in circumstances, thereby providing the effect of establishing a system enabling self-management of logistics without the intervention of a natural individual.

BRIEF DESCRIPTION OF DRAWINGS

FIGS. 2 to 5 are enlarged views of FIGS. 1A, 1B, and 1C, wherein FIG. 2 is a diagram illustrating a configuration of each module of the present system, FIG. 3 is a diagram illustrating a partial configuration of an AI engine, FIG. 4 is a diagram illustrating another partial configuration of an AI engine, and FIG. 5 is a diagram of an issue inferring function.

FIGS. 6 to 7 are embodiments of a projection simulator and subsequent usage prediction.

FIGS. 8 to 9 are embodiments of an automatic alarm function of an LPO purchase order.

DETAILED DESCRIPTION

Figure 1A:
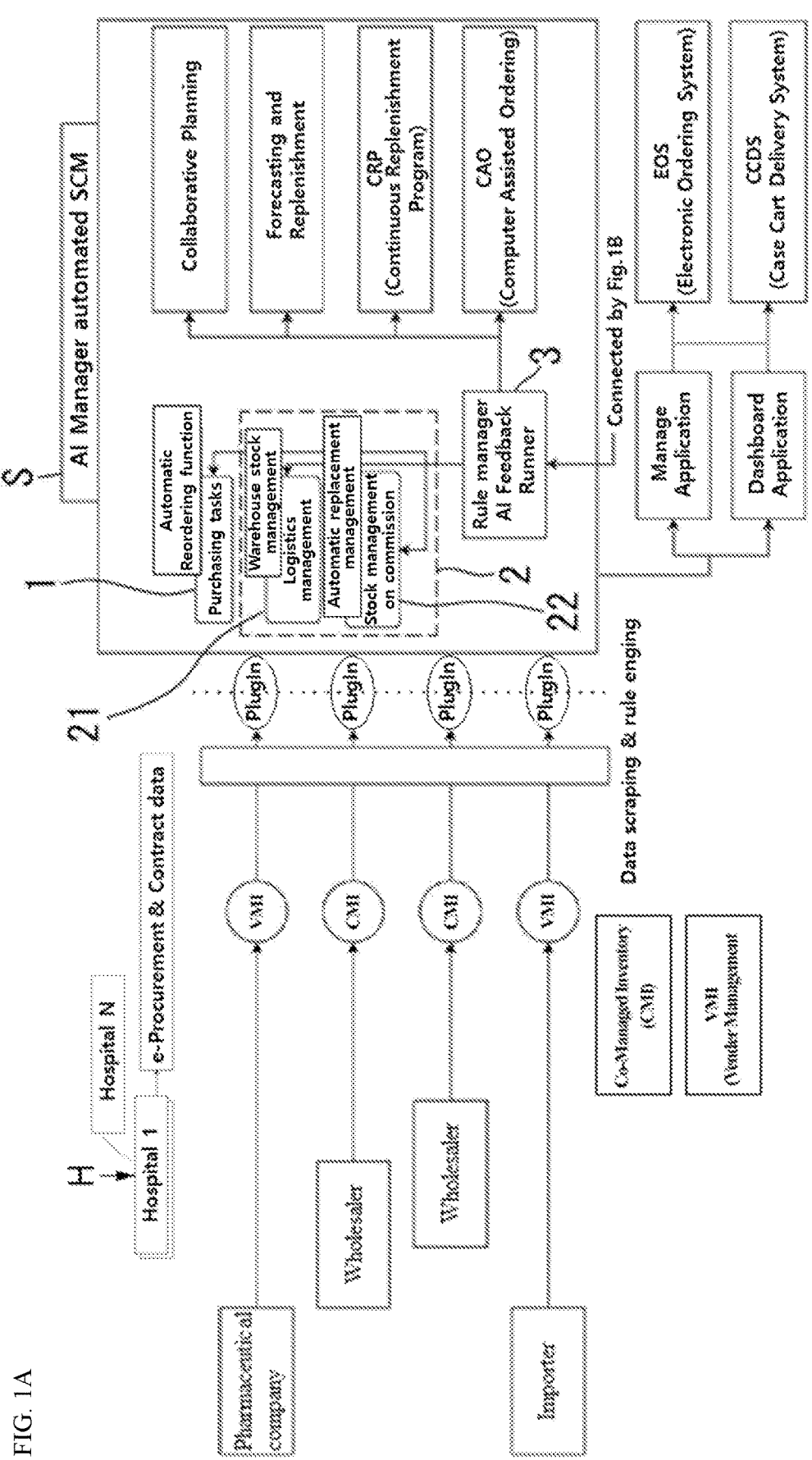
FIGS. 1A, 1B, and 1C are an overall configuration of the present system.

Since the present disclosure may be applied with various modifications and have various forms, aspects or embodiments will be described herein in detail. However, this is not intended to limit the present disclosure to a specific disclosure form and should be understood to include all modifications, equivalents and substitutes included in the spirit and scope of the present disclosure.

The terms used herein are used only to describe specific embodiments (aspects, or example embodiments) and are not intended to limit the present disclosure. Singular expressions include plural expressions unless the context clearly implies otherwise. In the present application, the terms ~include~ or ~consist of~ are intended to designate the existence of features, numbers, steps, operations, components, parts, or combinations thereof described in the specification, and it should be understood that it does not exclude, in advance, the possibility of the existence or addition of one or more other features, numbers, steps, operations, components, parts, or combinations thereof.

Unless otherwise defined, all terms used herein, including technical or scientific terms, have the same meaning as generally understood by those skilled in the art to which the present disclosure pertains. Terms such as those defined in commonly used dictionaries should be construed as having meanings consistent with meanings in the context of the relevant art and are not to be construed in an ideal or overly formal sense unless clearly defined in the present application.

The ~ first ~ and ~ second ~ etc. described herein are only to be referred to distinguish each different components and are not constrained by the order of manufacture, and the terms may not correspond in the detailed description and the claims of the present disclosure.

Hereafter, the present disclosure will be described in detail with reference to the accompanying drawings.

The present disclosure relates to an integrated hospital logistics management system (hereinafter referred to as the present system (S)) and an integrated hospital logistics management method (hereinafter referred to as the present method) using the same, in which artificial intelligence analyzes trends and seasonal trends using big data to maintain an appropriate safety stock level according to a stock quantity, stock state, and issue quantity of hospital items.

First, the present system (S) is an integrated hospital logistics management system that is linked with a warehouse that manages the logistics of hospitals and configure to manage stock by independently determining and processing orders, returns, and replacements of hospital items, including, as shown in FIGS. 1 to 5, an order processing module 1 configured to process ordering and warehousing of items by being linked with suppliers that provide hospital items, a logistics management module 2 configured to request the order processing module 1 to purchase or replace the items according to states of items in a hospital, and a system control module 3 configured to learn rules related to the operation of the items through artificial intelligence (AI) so as to control the logistics management module 2 thereby.

Prior to the description of the present disclosure, the definition of the term 'item' as used for description herein should be interpreted as a concept that includes various items such as equipment, drugs, and consumables as well as apparatuses broadly used in hospitals.

In describing the present system S in more detail for each configuration, the order processing module 1 is configured to process ordering and warehousing of items by being linked to suppliers that provide hospital items.

Figure 2:
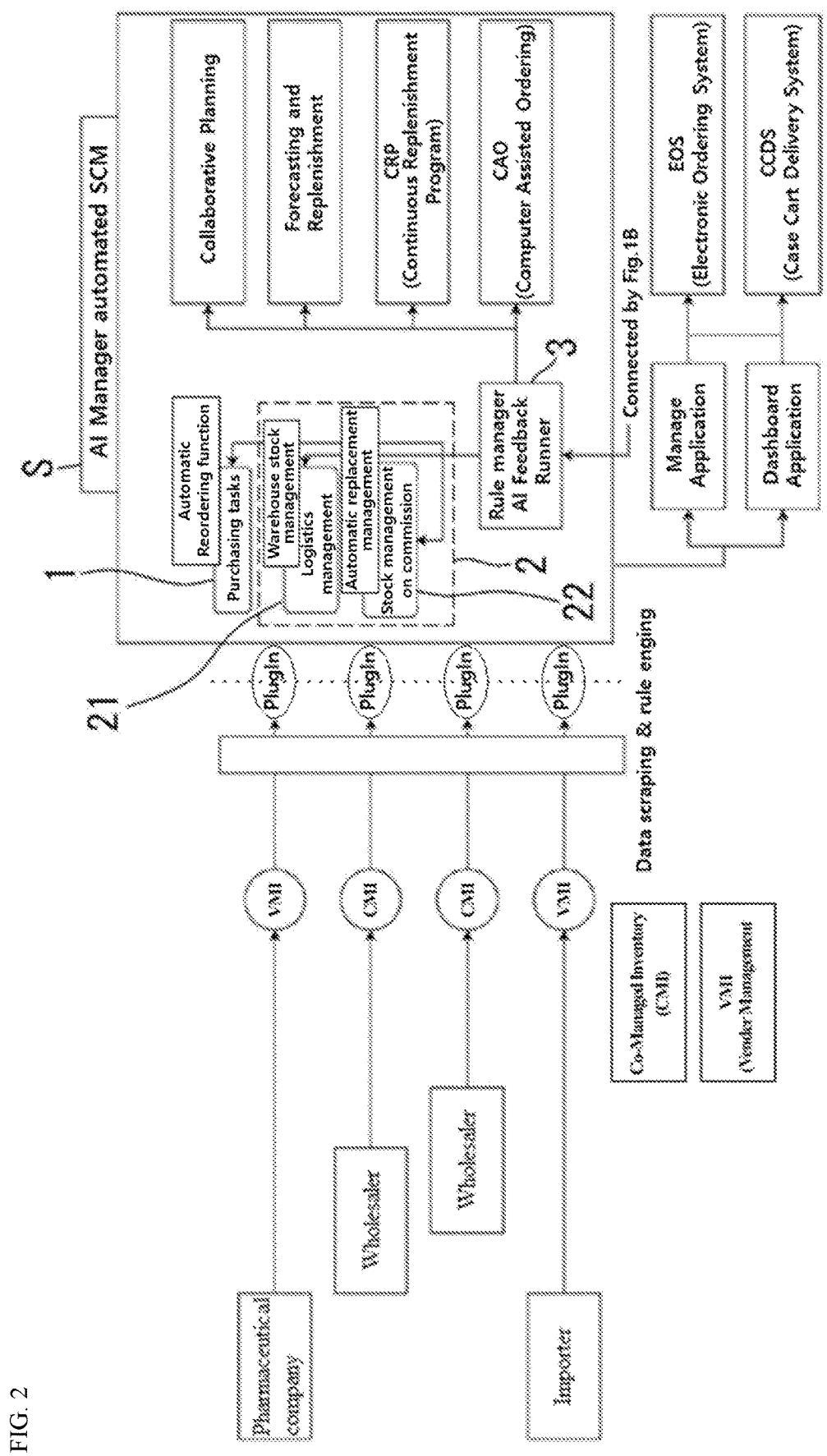

As shown in FIG. 2, the system S may be associated with various supplier channels such as pharmaceutical companies, commodity wholesalers, and importers, and such supplier channels may be managed with various options such as Co-Managed Inventory (CMI) and Vender Management Inventory (VMI). In general, supply contracts with wholesalers are made with CMI, and that with pharmaceutical companies or importers with VMI.

In addition, the item supply from suppliers is set to be viewed and managed through an identification tool for each supplier, wherein, in general, the identification tool may consist of an ID and a password, but is not necessarily limited thereto.

The present system S is configured to control the operation of the order processing module 1 through a system module instead of a human being, specifically, that the ordering and warehousing of items are automatically processed by the system module rather than the manual work of a manager. To this end, the order processing module 1 may include a plug-in interface for linkage with programs used for item supply for each supplier.

For more details of the order processing module 1, refer to the general knowledge of ordinary technicians and the previously known techniques.

Next, the logistics management module 2 is configured to request the order processing module 1 for purchase or replacement of items in accordance with the state of items in the hospital.

As shown in FIG. 2, the order processing module 1 includes a stock management unit 21 configured to check the stock of items in the warehouse and manage the stock in the warehouse, and a replacement processing unit 22 configured to check the state of items in the warehouse to process replacement.

It is preferable that the present system (S) is applied to be linked to a warehouse that particularly manages hospital items on commission, wherein the stock management unit 21 is configured to process and manage the ordering, warehousing, and disposal of the items in conjunction with the change in stock quantity due to the issue of the items by checking a stock quantity in the warehouse.

In addition, the replacement processing unit 22 is configured to process the replacement by checking the state of items in the warehouse, wherein the state of items may include lapses of the expiration date, product defects, etc., and the supplier exchanges the items according to the previously concluded contract when the expiration date elapses or defects occur.

Next, the system control module 3 is configured to learn the rules related to the operation of the items through artificial intelligence (AI) and control the logistics management module 2 thereby. In addition, the system control module 3 may also be configured to control over the order processing module 1 which may be controlled by the logistics management module 2, system control module 3 or both, such that there's no need to be limited in any one particular form.

As shown in FIG. 2, the system control module 3 may include four functions, such as Collaborative Planning with suppliers, Forecasting and Replenishment for changes in the stock of items, Continuous Replenishment Program (CRP) of items, and Computer Assisted Ordering (CAO).

Figure 1B:
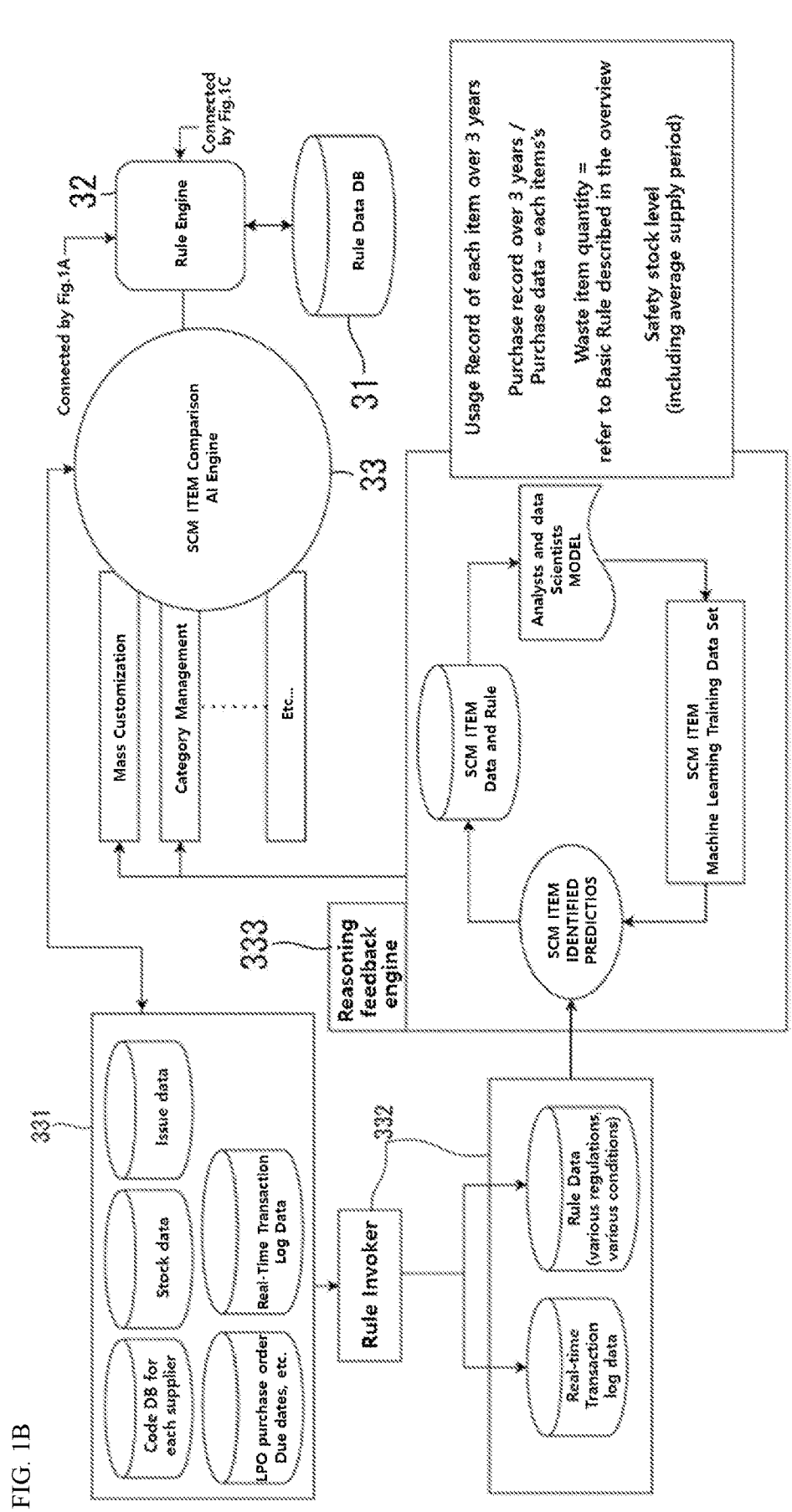
Figure 1C:
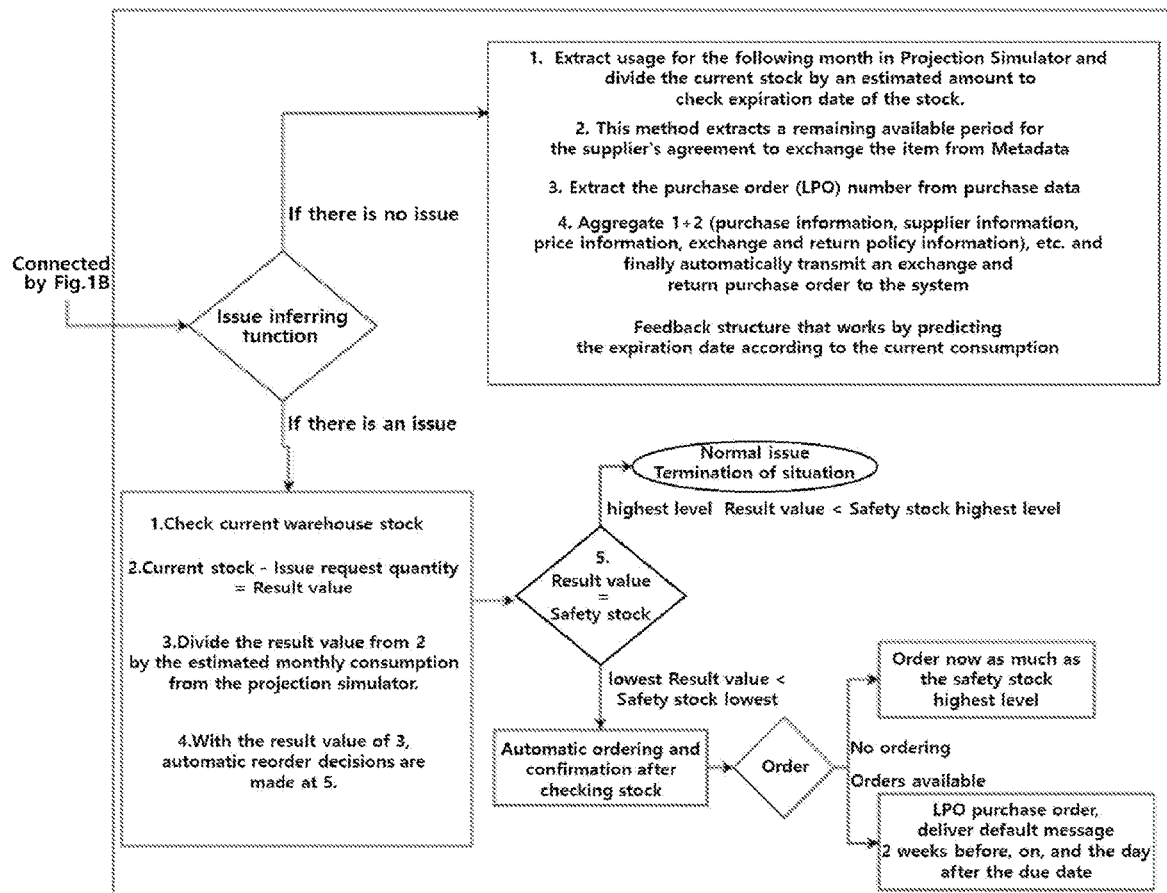

In addition, as shown in FIGS. 1A, 1B, and 1C, the present system S may operate by integrating and connecting multiple hospitals H in the same country and may also carry out integrated operation even for logistics centers in various countries. In addition, in the case that the operation is undertaken with each different names, codes, and attributes for the same item for each hospital H, the case may be configured to make the whole operated as a single unit through standard master coding, and, when communicating with each hospital H, the case may be configured to communicate by undergoing conversion into an item code used by the hospital. In addition, items used only in certain hospitals may be subjected to standard master coding for future expansion.

In addition, as shown in FIG. 2, the present system S may have an linkage interface for linkage with a predetermined management program and be configured to manage and operate through integration of various separate management programs such as Electronic Ordering System (EOS) and Case Cart Delivery System (CCDS).

In one example embodiment, as shown in FIG. 2, the present system S may include a dashboard application that provides a manager with a form in which all processes (transactions) taking place in integrated logistics warehouses are displayed and output on a dashboard, such that a manager may check the series of processing status. As another derived example, the dashboard may be configured to provide KPI achievements agreed with hospitals in advance through derivation of real-time, daily, weekly, and monthly statistics.

The above-described present system (S) is configured to manage stock by independently determining and processing orders, returns, and replacements of hospital items so as to automatically operate integrated logistics management without intervention of a natural individual.

Hereinafter, the system control module 3, which is a key feature of the present system S, will be described in more detail.

As shown in FIGS. 1A, 1B, and 1C, the system control module 3 includes a machine learning unit 30 configured to generate and learn rules related to the operation of items using metadata. In addition, the system control module 3 further includes a control unit which is configured to control the logistics management module 2, the order processing module 1, or both according to the generated and learned rules, but the control unit is a part related to the control of each module as if a conventional logistics management system controls by being linked to other modules for system control, such that a detailed description will be omitted.

Also, as shown in FIGS. 1A, 1B, and 1C, the machine learning unit 30 is configured by including a rule database 31 configured to store the generated rules, a rule engine 32 configured to retrieve the stored rules or store the generated rules in the rule database 31, and an AI engine 33 configured to generate and learn the rules.

For each configuration, the rule database 31 may be configured to store the generated rules and implemented by general memory, and the rule engine 32 may be configured to be linked to the rule database 31 to retrieve the rules stored in the rule database 31 or store the generated rules in the rule database 31. In the foregoing, it is desirable that a constant pairing method is employed for the linkage between the rule database 31 and the rule engine 32, wherein the rule engine 32 is linked to the AI engine 33 for judgment, analysis, inference, and determination of the AI engine 33 to be described later and extracts data in the rule database 31 according to the rules determined in advance to provide to the AI engine 33.

In addition, the AI engine 33 is configured to take charge in generation and learning of the rules and is linked with the rule engine 32, and, when there is a change in stock such as warehousing, issues, returns, and replacements of items, it enables constant integrated operation for the rules generated by data engineering, the inference function to manage the issues, and the inference function for stock management. Such the AI engine 33 directly operates the artificial intelligence function set in the present system S, and the system control module 3 is configured to operate independently without the judgment and determination of a natural individual so that the present system S may be managed.

As a more specific example embodiment, as shown in FIGS. 1, 3, 4, and 5, the AI engine 33 includes a data collection part 331 configured to collect raw data of each item provided by the supplier, a rule generation part 332 configured to extract rules and conditions related to the operation of each item from the raw data to generate the rule, and a rule learning part 333 configured to learn metadata as learning data to reinforce the rules.

Figure 3:
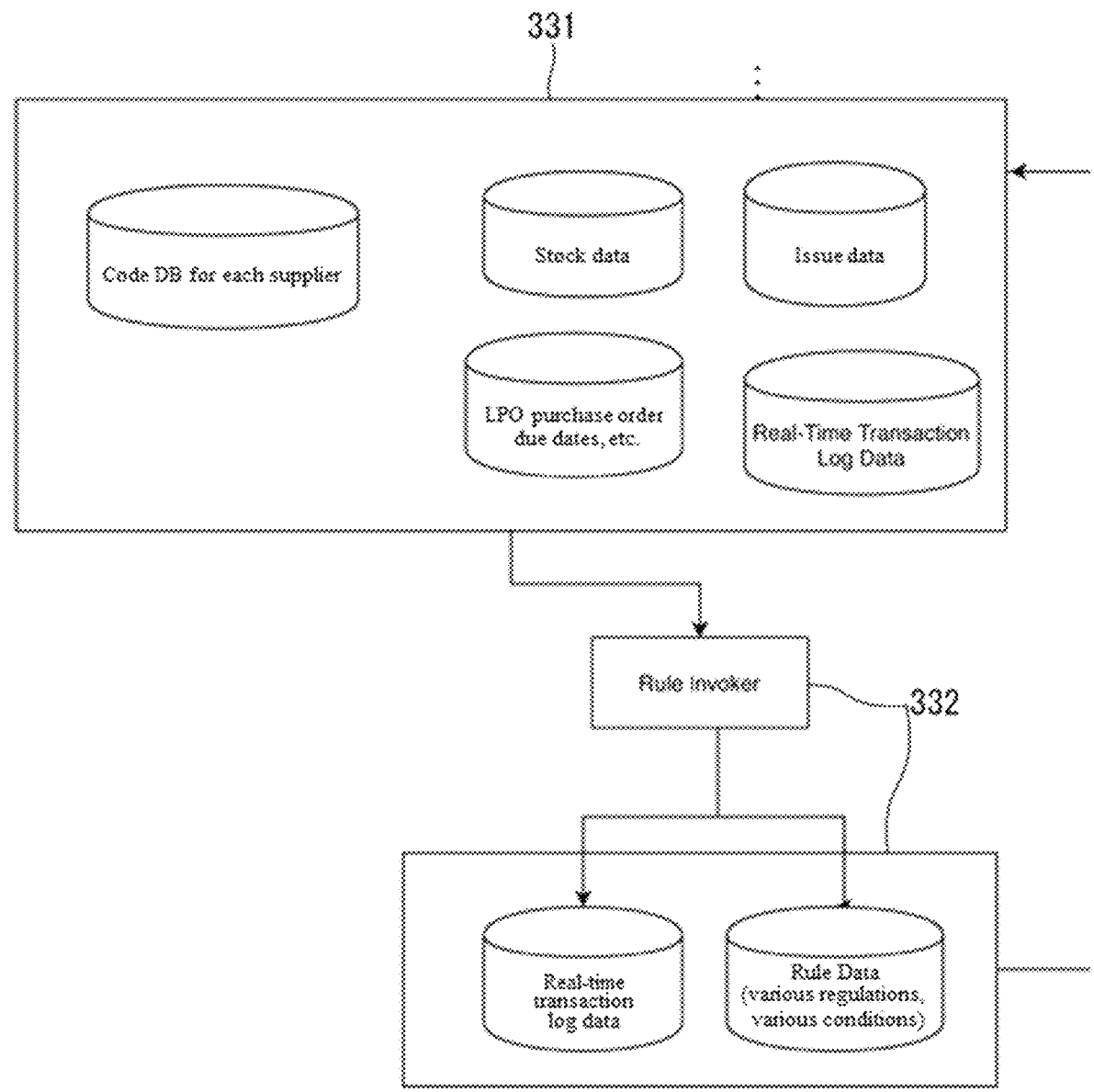

For each part, the data collection part 331 is configured to collect raw data of each item provided by the supplier and collect data such as codes for individual suppliers, stock data, issue data, LPO purchase order due dates, and real-time processing logs as shown in FIG. 3, wherein each data may be stored in a database. In one example embodiment, since the form of the raw data of the item supplied by each supplier may be different, a data conversion interface configured to collect the raw data may be included.

As a detailed example embodiment, the code data for each development supplier is a basic data value configured to databasize code data for each hospital and each item so as to enable constant extraction.

In addition, stock data is information configured to be automatically linked by all processes such as warehousing, release, returns, and replacements in real time, and the stock data may be constantly processed by means of the rule engine 32 and the AI engine 33 described above.

In addition, the issue data is information that may be selected by LOT, batch, expiration date, and issue rules of the item upon issue request.

In addition, the data on the LPO purchase order due date is information which is linked by being automatically extracted from the purchase contract data while the due date is automatically calculated according to the real-time usage, and enables setting of the reorder time that is the basis for the automatic ordering of the system.

In addition, real-time processing log data is not utilized within the normal operation range that is input to the Warehouse Control System (WCS), but is applied to stop the system operation in a state beyond the normal operation range and perform administrator action requests.

Next, the rule generation part 332 may be configured to extract regulations and conditions related to the operation of each item from the raw data to generate the rule and also configured to collect regulations or conditions related to the operation of each item included in the raw data to generate rules for each item and perform the role of monitoring whether the regulations and conditions are well followed. When the system is operated beyond the regulations and conditions, the rule generation part 332 automatically stops the system and invokes the manager to operate the system under the normal operation range.

Next, the rule learning part 333 is configured to reinforce rules by learning metadata as learning data, wherein, when rules need to be reinforced to control the stock quantity due to changes in conditions or regulations, changes in trends and seasonal trends, and various other circumstances, the rule learning part 333 plays a role in changing the rules by learning using metadata. Here, the reinforcement of rules refers to changes in conditions, changes in regulations, changes in standards for the management of other items.

Figure 4:
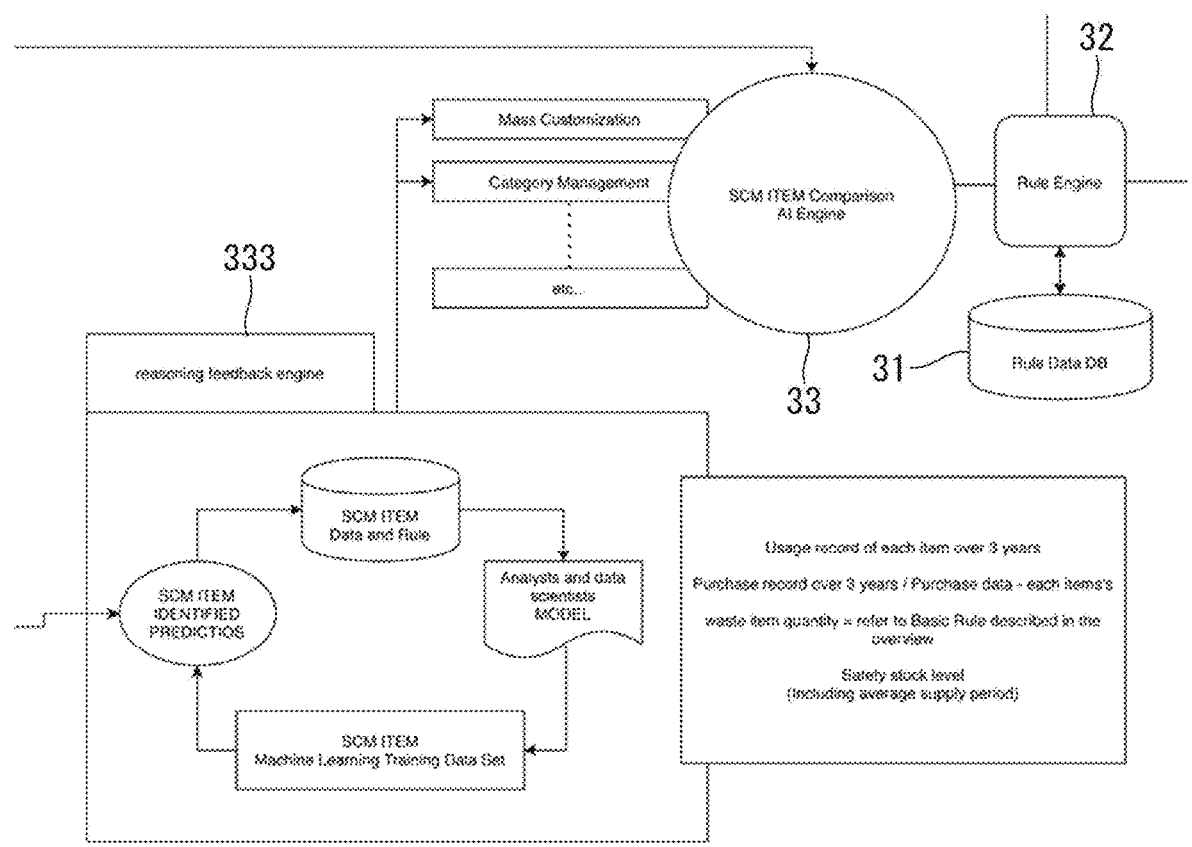

As shown in FIG. 4, the rule learning part 333 is configured to generate rules and indices to allow machines to communicate with each other by metadataizing big data, and reinforce the rules through machine training to generate a rule model by data engineering. At this time, mass customization and category manager may be utilized as a concept of an engine for inference.

In one example embodiment, the foregoing rule is a stock management regulation to determine the order quantity according to the stock quantity, and the learning data includes a usage record and a purchase record for a predetermined period for the item, wherein the rule learning part 333 is configured to calculate the average waste amount through the usage record and the purchase record and reflect the calculation in the stock management regulation so as to variably apply the safety stock level.

For example, when the usage of item A is gradually reduced by the excellent product of a competitor, it is desirable to lower the safety stock level, which is the amount that must be held, such that the waste amount of A may be calculated by using the metadata of 3-year usage of item A and the 3-year purchase amount of item A, and reinforcing is executed in a way of loosening the rule of safety stock level corresponding to the required stock quantity using the waste amount of A as learning data (refer to FIG. 4).

Figure 5:
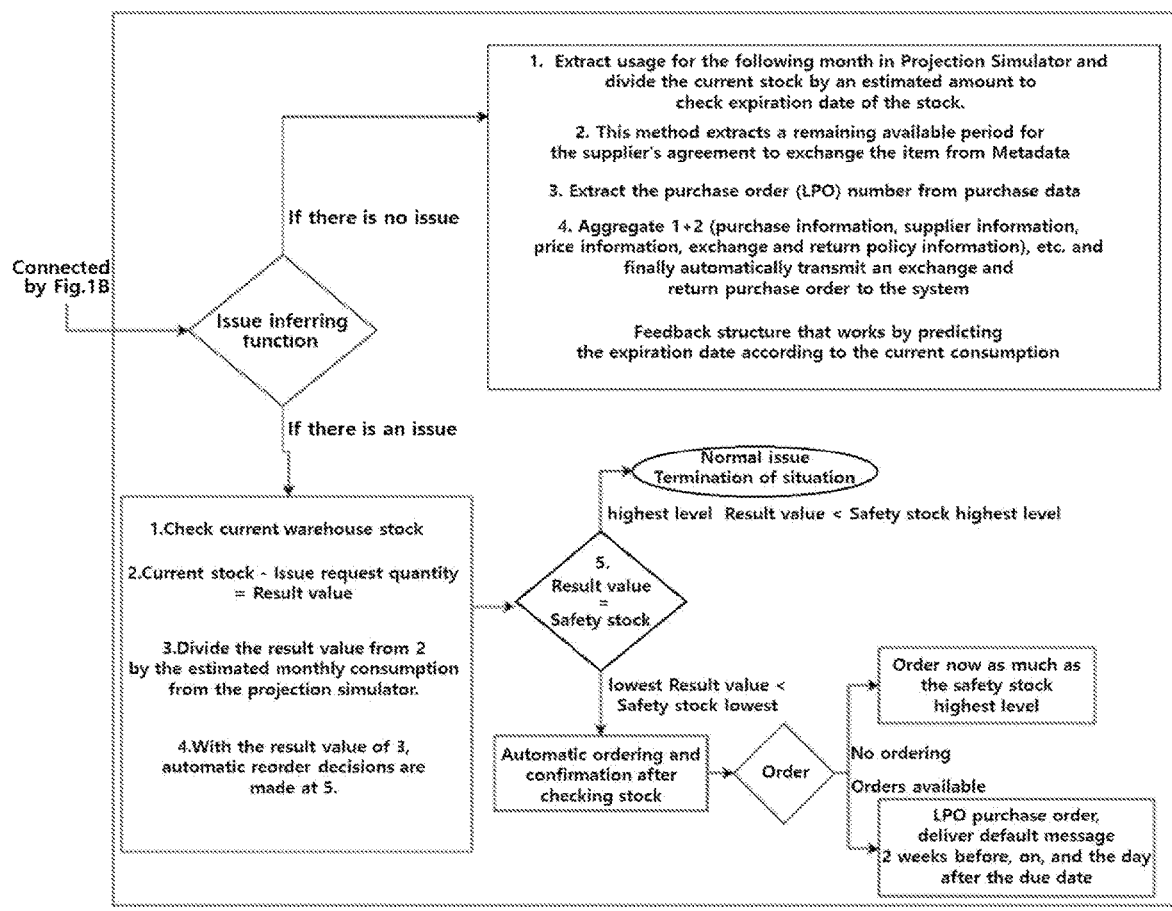

On the other hand, as a more enhanced example embodiment of the rule learning part 333, the present system S may be configured to more precisely manage the safety stock level by introducing whether to issue the item. As shown in FIG. 5, the machine learning unit 30 may be configured to infer whether to issue so as to make the present system S automatically determine and cope with the stock in the warehouse without passing the expiration date.

According to the enhanced example embodiment above, if there is an issue for the item and the remaining quantity out of the current stock quantity is in the current usage pattern, inference and calculation are performed on the stock quantity based on the lowest level of safety stock, and when the purchase data is loaded and the order of the item is placed to the supplier, the average due date is additionally calculated to figure out the arrival time in the warehouse, such that the order is automatically processed to meet the highest level of safety stock using the same.

Specifically, as shown in FIG. 5, the performing of an issue inferring function includes checking the stock quantity of the item in the current warehouse if there is an issue, calculating the remaining stock quantity by subtracting the issue request quantity from the current stock, calculating an exhaustion date by dividing the remaining stock quantity by the predicted monthly consumption amount derived from a projection simulator, and comparing the exhaustion date with the average due date of the item. In addition, it also includes determining as normal issue when the remaining stock quantity is less than the highest level of the safety stock compared with the safety stock and performing automatic order processing after checking the stock when the remaining stock quantity is less than the lowest level of the safety stock. At this time, it may be configured to place an order in an amount comparable to the highest level of the safety stock if there is no previously requested order, and, if previously requested order exists, the elapsed period is calculated to notify the manager. In particular, additional executions may be possible, such as providing the exhaustion date calculated above to the manager when calculating the elapsed period and making a contact with the supplier so as to enable urgent order processing.

In addition, as shown in FIG. 5, the performing of the issue inferring function may include, if there is no issue, performing simulation through the current usage patterns to automatically place re-order when re-order is in need.

Further, as shown in FIG. 5, the performing of the issue inferring function may further include, if there is no issue, extracting a point in time when exchange and return are available under the terms of the purchase contract to automatically apply for replacement before the deadline.

As a result, the issue inferring function may be summarized as a function of making decisions to request reorders and replacements by inferring stock exhaustion date and exchange and return date for all items in the warehouse based on the current real-time usage patterns.

Hereinafter, the integrated hospital logistics management method (the present method) using the present system S includes the following operations.

The present method includes extracting regulations and conditions related to the operation of the item through raw data for each item in hospitals provided by the supplier to generate rules, metadataizing the input big data and learning and reinforcing the rules using the metadata as learning data, and checking the state of the item and requesting the supplier for a stock processing request including purchase or replacement for the item according to the rules.

Since the more specific features of the present method overlap with that of the present system (S) described above, unnecessary repetitive description will be omitted.

Referring to the accompanying drawings below, specific example embodiments of hospital item management to which the present system (S) and the present method are applied will be described.

Figure 7:
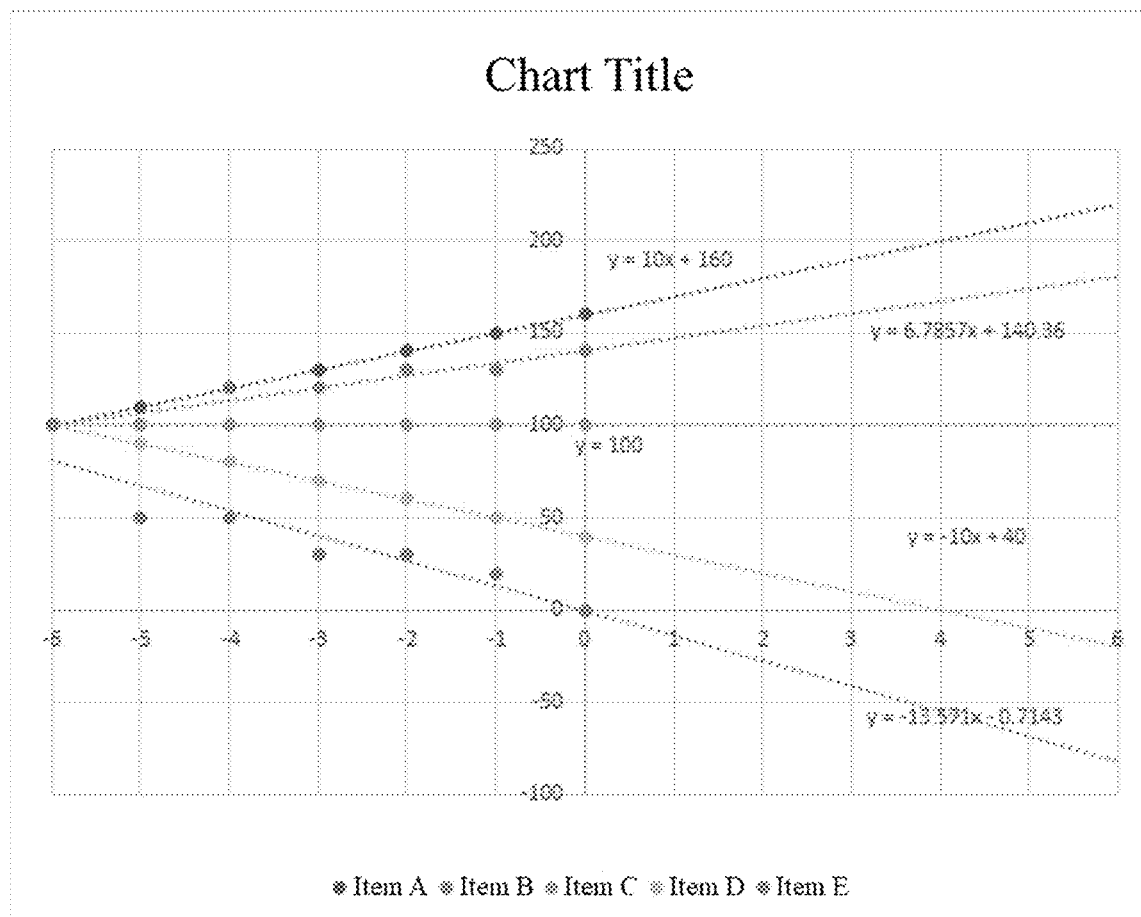

First, FIGS. 6 to 7 show an example embodiment (based on 6 months) for predicting future usage through a projection simulator. As shown in FIG. 6, in the case of item A, the usage is increasing by 10 per month, in the case of item B, it is increasing less than the item A, in the case of item C, it remains constant, and items D and E are gradually decreasing.

By graphing the same, a graph may be drawn as shown in FIG. 7, and the expected future usage may be calculated through a trend line derived from a six-month usage pattern. Referring to FIG. 7, the projection formulas may be defined by y=10x+160 for item A, y=6.7857x+140.36 for item B, y=100 for item C, y=−10x+40 for item D, and y=−13.571x−0.7143 for item E. Such the trend line derivation method enables calculation of the predicted usage after a certain period of time, and in particular from the above, since the stock quantity may not increase without an order, the negative value may be inferred that there will be no issue.

In the above, since there is a method of using a curved graph rather than a straightened graph to predict future usage, to express the same more generally, if the usage change formula is called f(x), the total predicted usage after 3 months is f(1)+f(2)+f(3). The required order quantity may be calculated by comparing the predicted usage with the current stock quantity, and the formula for the required order quantity may be defined as in the following Expression 1.

$$\left(\sum_{x=1}^{3} f(x)\right) - s(\text{Current stock quantity}) \quad \text{EXPRESSION 1}$$

In the above, $$\sum_{x=1}^{3} f(x)$$

is reset in real time to the highest level of safety stock.

For brief explanation, if applied to the trend line formula, provided that the formula of the usage trend line for item F is f(x)=10x+110, the predicted usage after one month will be 120, and that after three months will be 390, derived by 120+130+140. If the current stock quantity is 300 which is derived by 390−300, the system will automatically reorder 90 items A in order to secure stock quantity sufficient for the next three months.

The above Expression 1 may be applied to a case when the predicted usage increases, and the case when the predicted usage decreases may be calculated through the following Expression 2. When the predicted usage decreases, unused stock quantity is calculated by subtracting predicted usage after 3 months from the current stock quantity.

$$s(\text{Current stock quantity}) - \left(\sum_{x=1}^{3} f(x)\right) \quad \text{EXPRESSION 2}$$

The remaining stock quantity calculated by Expression 2 is configured to extract conditions for disposal or replacement such as service life or expiration date to process return, exchange or disuse.

For brief explanation, if applied to the trend line formula, provided that the formula of the usage trend line for item G is f(x)=−10x+110, the predicted usage after one month will be 100, and that after three months will be 270, derived by 100+90+80. If the current stock quantity is 400 which is derived by 400−270, automatic return will be processed for items with a service life of less than 6 months, analyzed by the system, out of 130 unused items.

As other example embodiments of hospital item management using the present system S and the present method, it is possible to carry out procedures such as return procedures for discarded medical items through expiration date management, quantitative replenishment procedures, cold chain product management procedures, and unissued item management procedures.

First, the return procedures for discarded medical items is that AI engine 33 extracts the current stock data and information on expiration date, the simulator extracts the predicted monthly usage based on a predetermined period (e.g., 6 months), and the AI engine 33 uses the same to manage expiration date for the entire items in the stock.

And, the quantitative replenishment procedure is that the hospital sets the safe quantity of the item for each end user, and when the quantity collected by an inspection device such as barcodes reaches half the amount, the warehouse automatically gives a picking and packing order to the end user and also gives a refill order to the supplier corresponding to the order quantity.

In addition, the cold chain product management procedure is to extract purchase contract data for refrigerated/frozen products, calculate the quantity that may be used before the expiration date using the current stock by the simulator, and extract the delivery period from the contract data so as to process automatic orders including the delivery period.

In addition, the unissued item management procedure is to extract a product that has never been issued for a predetermined period of time, search for a substitute item for the product while blocking the substitute item not to be issued in the system if the substitute item is issued but the existing product is not, notify the result to a clinician through hospital information system (HIS), switch, if existing item is run out, the substitute item, and notify the result to the clinician. At this time, if there is no substitute item, the return may be immediately processed, and replacement to other items according to the conditions of the contract may also be processed.

Next, an example embodiment of an automatic alarm function of an LPO purchase order will be introduced.

FIG. 8 is a part of a data sheet having information on the LPO purchase order. In this sheet, various information may be identified, such as LPO number, LPO issue date, due date, etc., wherein the most important part of the sheet is the rightmost column. A column, labeled as Days left, automatically calculates the number of days to the due date based on today's date, and generates three alarms as follows.

First, if there are 30 days left before the due date as of today, the cell will turn red and an alarm will be sent to the supplier asking whether it is possible to supply after a month.

Second, if there is one day left before the due date as of today, the cell will turn green and an alarm will be sent to the supplier asking whether it is possible to supply by tomorrow.

Third, if one day has passed since the due date as of today, the cell will turn yellow and a notification will be given that the purchase will be carried out from another supplier under a third-party contract.

Next, an example embodiment related to an automatic management function for non-moving or slow-moving items will be disclosed.

FIG. 9 shows the calculated value of the predicted usage for the next six months as a result of analyzing the 6-month usage of item Z and item Y. As a result value, the manager is notified whether the item is non-moving or slow-moving.

If the predicted usage is still zero, it is classified as non-moving and the cell turns red, and if the predicted usage is less than 50% of the usual consumption, the cell is displayed in green. Predicted usage is calculated with FORECAST.LINEAR( ) function available in Excel.

In the above description, a description of the physical configuration of the circuits and device units constituting the present system S has been omitted, but it is apparent that the present system S and the present method are realized via a computer (or equivalent predetermined means), such that the description of the physical configurations follows ordinary knowledge.

In addition, the present disclosure described with reference to the drawings attached above may be variously modified and changed by those with ordinary skill, and such modifications and changes that are not limited through the claims should be construed as being included in the scope of the present disclosure.

The invention claimed is:

1. An integrated hospital logistics management system, comprising:
an order processing module configured to process ordering and warehousing of items by being linked to suppliers that provide hospital items;
a logistics management module configured to request the order processing module to purchase or replace the items according to a state of items in a hospital; and
a system control module comprising a machine learning unit configured to generate and learn rules related to operation of the items by using metadata and a control unit configured to control the logistics management module according to the rules,
wherein the machine learning unit comprises:
a rule database configured to store the generated rules;
a rule engine linked to the rule database and configured to retrieve the rules stored in the rule database or store the generated rules in the rule database; and
an AI engine comprising a data collection part linked to the rule engine and configured to collect raw data of each item provided by the supplier, a rule generation part configured to extract regulations and conditions related to the operation of each item from the raw data to generate the rules, and a rule learning part configured to learn the metadata as learning data to reinforce the rule, and
the machine learning unit is configured to infer whether to issue to automatically determine and cope with, so as to avoid passing of an expiration date of stock in a warehouse, and
wherein the machine learning unit is configured to:
make decisions to request reorders and replacements by inferring stock exhaustion date and exchange and return date for all items in the warehouse based on current real-time usage patterns, and
extract a point in time when exchange and return are available under terms of purchase contract to automatically apply for replacement before a deadline.

2. The integrated hospital logistics management system of claim 1, wherein the machine learning unit is configured to automatically process an order if there is an issue after checking the stock when a remaining stock quantity is less than the lowest level of safety stock, and, if a pre-requested order exists, calculate a time period elapsed after ordering to notify a manager.

3. The integrated hospital logistics management system of claim 2, wherein the machine learning unit is configured to check a current stock quantity of the item in the warehouse if there is an issue, calculate the remaining stock quantity by subtracting an issue request quantity from the current stock, calculate an exhaustion date by dividing the remaining stock quantity by a predicted monthly consumption amount derived from a projection simulator, and provide the calculated exhaustion date to the manager along with the time period elapsed after the ordering so as to enable urgent order processing.

4. An integrated hospital logistics management method using an integrated hospital logistics management system comprising an order processing module, a logistics management module, and a system control module comprising a machine learning unit which is configured to generate and learn rules related to operation of items by using metadata, the method comprising:
a rule generating operation for extracting, by the machine learning unit, through raw data for each item in a hospital provided by a supplier, regulations and conditions related to the operation of the item to generate rules; a rule learning operation for metadataizing, by the machine learning unit, input big data and learning and reinforcing the rules using the metadata as learning data; and
a stock processing requesting operation in which the logistics management module checks a state of the item and the order processing module requests the supplier for a stock processing request comprising purchase or replacement for the item according to the rules,
wherein the stock processing requesting operation further comprises an issue inferring function performing operation for inferring, by the machine learning unit, whether to issue so as to automatically determine and cope with stock in a warehouse without passing an expiration date, and
the issue inferring function performing operation comprises extracting a point in time when exchange and return are available under terms of purchase contract to automatically apply for replacement before a deadline.

* * * * *